R. THRELFALL.
Loading and Unloading Wagons.
No. 134,330. Patented Dec. 24, 1872.
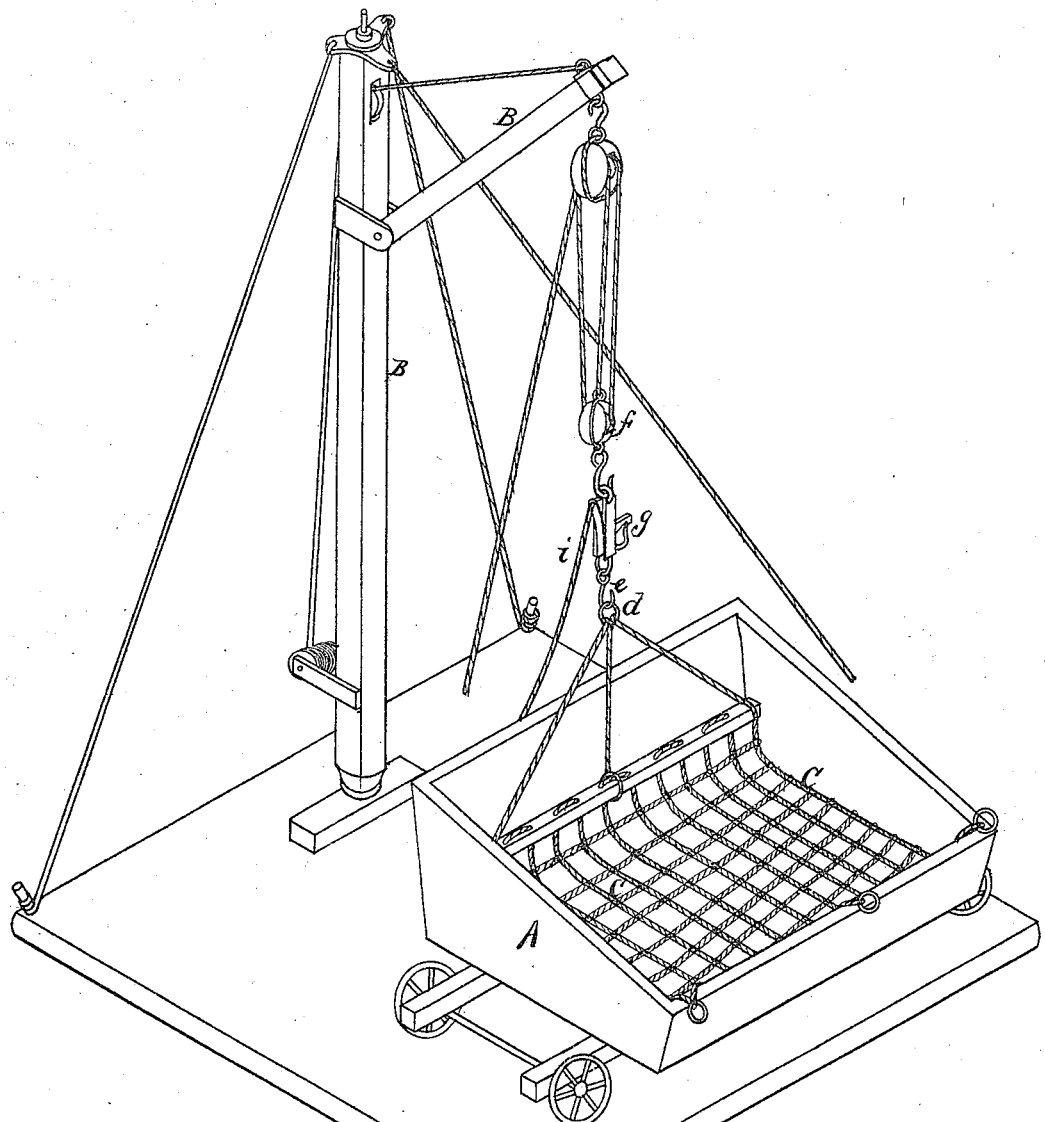
Witnesses
J. L. Borne
G. W. Richardson
Richard Threlfall
per Dewey & Co.
Attys

UNITED STATES PATENT OFFICE.

RICHARD THRELFALL, OF CENTREVILLE, CALIFORNIA.

IMPROVEMENT IN LOADING AND UNLOADING WAGONS.

Specification forming part of Letters Patent No. 134,330, dated December 24, 1872.

*To all whom it may concern:*

Be it known that I, RICHARD THRELFALL, of Centreville, Alameda county, State of California, have invented Improvements in Unloading Header-Wagons; and I do hereby declare the following description and accompanying drawing are sufficient to enable any person skilled in the art or science to which it most nearly appertains to make and use my said invention or improvements without further invention or experiment.

My invention relates to an improved method and arrangement for unloading the wagons which run between the header and the thrashing-machine for the purpose of conveying the cut grain to the thrasher or stack.

Heretofore this work has usually been done with forks operated from a swinging derrick or crane; but this method of unloading is too slow to keep the thrasher supplied with a uniform feed.

My invention contemplates an arrangement whereby the entire wagon-load of cut grain can be unloaded at one operation, so as to permit the work of carrying the cut grain from the header to the thrasher to be done by a less number of wagons, while the feed of the thrashing-machine is rendered more uniform, and the grain will be less liable to be cracked.

In order to more fully illustrate and explain my invention, reference is had to the accompanying drawing forming a part of this specification, in which—

Figure 1 is a perspective view of the machine.

A represents a wagon, such as is usually employed for conveying the grain from a header to the thrashing-machine. B is a swinging crane or derrick, such as is frequently used for unloading the header-wagon by means of hay or grain forks. Instead of the hay or grain fork I propose to employ a netting, C, or other closed piece of fabric large enough to cover the entire bottom and sides of the wagon. The cut grain is then taken from the header and placed in the wagon upon the netting or other false bottom C until the wagon is loaded.

When the wagon has arrived at the derrick B the loop $d$, on one side of the netting or false bottom C, is caught in the hook $e$ which depends from the cord and pulley $f$ of the derrick, while the two opposite corners are caught up and secured to a suitable detaching apparatus, $g$, thus forming a large bag, in which the load of grain is contained. The derrick is then employed to lift the load of grain thus conditioned and swing it around above the feeding table or stack, upon which it is dumped by drawing upon the cord $i$, which uncouples the detaching apparatus and releases the grain.

Any of the usual styles of detaching apparatus can be used, and any pliable yielding false bottom will answer.

By this means I provide a simple and effective arrangement for unloading wagons, which will save time, labor, and expense, and at the same time greatly facilitate and benefit the thrashing operation.

Having thus described my invention, what I claim, and desire to secure by Letters Patent, is—

1. The false bottom C, in combination with the wagon A and derrick B, substantially as and for the purpose above described.

2. The false bottom C with its loop $d$, in combination with the hook $e$ and detaching apparatus $g$, substantially as and for the purpose above described.

In witness whereof I hereunto set my hand and seal.

RICHARD THRELFALL. [L. S.]

Witnesses:
J. L. BOONE,
C. M. RICHARDSON.